United States Patent [19]
Breimesser

[11] Patent Number: 4,825,685
[45] Date of Patent: May 2, 1989

[54] PRESSURE TRANSDUCER

[75] Inventor: Fritz Breimesser, Nuernberg, Fed. Rep. of Germany

[73] Assignee: Siemens Aktiengesellschaft, München, Fed. Rep. of Germany

[21] Appl. No.: 159,317

[22] Filed: Feb. 23, 1988

[30] Foreign Application Priority Data

Feb. 24, 1987 [DE] Fed. Rep. of Germany ....... 3705901

[51] Int. Cl.$^4$ .......................... G01L 7/08; G01L 9/06; G01L 27/00
[52] U.S. Cl. ...................................... 73/4 R; 73/727; 310/328; 310/338
[58] Field of Search ................. 73/4 R, 708, DIG. 4, 73/726, 727, 720, 721; 310/328, 338; 338/4

[56] References Cited

U.S. PATENT DOCUMENTS 2,569,987 10/1951 Frondel ............................. 310/338
2,571,899 10/1951 Kroft et al. ....................... 310/328
3,766,415 10/1973 Dame et al. ...................... 310/328

FOREIGN PATENT DOCUMENTS 0040795 12/1981 Fed. Rep. of Germany .
0033749 5/1984 Fed. Rep. of Germany .
0195985 10/1986 Fed. Rep. of Germany .

Primary Examiner—Donald O. Woodiel
Attorney, Agent, or Firm—Kenyon & Kenyon

[57] ABSTRACT

A self monitoring pressure transducer includes a reference chamber, that transmits the pressure through a fluid medium to the flat side of a diaphragm, using a piezoelement, arranged in the reference chamber, as an electrically controllable actor. The piezoelement can modulate the pressure in the reference chamber by a predetermined quantity. The modulation of the measuring signal associated with this pressure modulation permits self-monitoring of the pressure transducer while it is in operation.

3 Claims, 1 Drawing Sheet

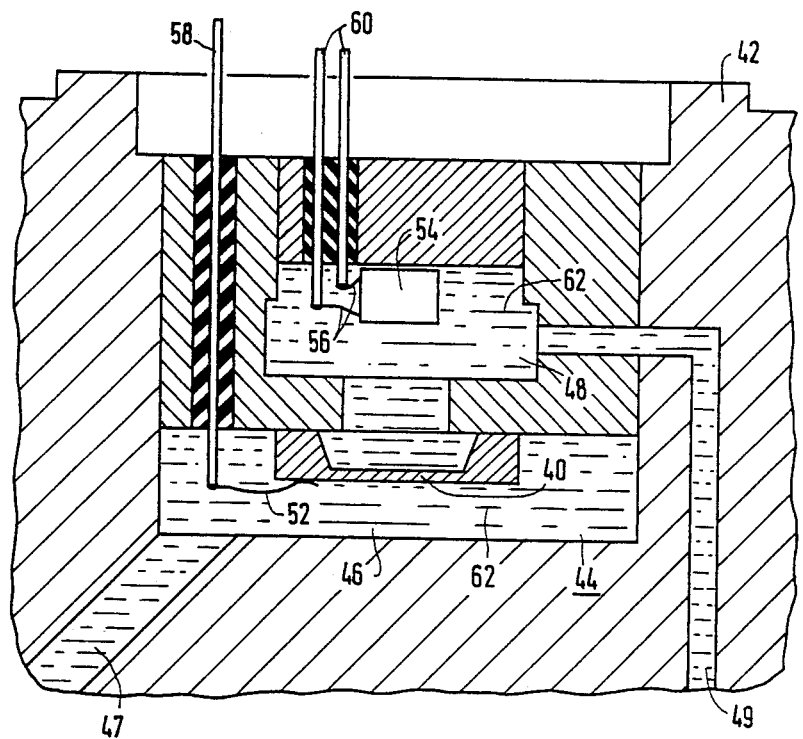

PRESSURE TRANSDUCER

BACKGROUND OF THE INVENTION

The invention relates to a pressure transducer. In particular the invention relates to a pressure transducer arranged in a casing and having a measuring diaphragm.

Such pressure transducers are known, for example from the European patent No. 0 033 749. There, a pressure gauge head is disclosed, which contains a measuring diaphragm of silicon in a cylindrical casing. The excursion of the diaphragm serves as a measure of a pressure difference acting on the front faces of the diaphragm. The diaphragm divides the interior space of the casing into two gas-tight chambers sealed against each other. The chambers are in each instance provided with inlet tubes, which guide the pressure to be measured from the measuring site into the chambers. The excursion of the diaphragm is measured by way of a resistance change in piezoresistive resistance elements which are diffused into the silicon diaphragm. The electrical signal corresponding to the resistance change is led out of the casing of the pressure gauge head through gas-tight electrical lead-throughs.

Conversion of the diaphragm excursion into an electrical signal takes place, for example, with a capacitive measuring arrangement (EP-A2-0 195 985) or a ring oscillator circuit (EP-A2-0 040 795) integrated into a silicon diaphragm.

In modern measuring and automation technology the demand has risen for sensors and signal processing systems connected to the sensors. The signal processing systems are in a position to detect faulty functioning of the sensor and to reduce the effect of such faulty functioning to a large extent. Such faulty functioning can be caused by the sensor itself, for example, through a change of its sensitivity and its zero point. An important source of errors can, however, also be coupling of the sensor to the physical variable. Monitoring the entire measuring chain, which includes the sensor and the succeeding signal processing systems, is more advantageous the closer to the start of the measuring chain the monitoring intervenes.

However, with the known pressure transducers, self-monitoring is not possible. Faulty functioning of these pressure transducers can only be recognized when the transducer is uncoupled from the physical variable to be measured and subjected to a separate calibration. While this calibration is in progress, the sensor is not available for the actual measuring process.

SUMMARY OF THE INVENTION

The present invention obviates this problem by providing a pressure transducer, Which permits self-monitoring of faulty functioning while it is in operation without interrupting the measuring process.

The pressure transducer includes:

(a) an electrical measuring arrangement for converting an excursion of said measuring diaphragm into an electrical signal;

(b) a pressure chamber, bordering on a first flat side of said measuring diaphragm; and (c) a reference chamber, bordering on a second flat side of said measuring diaphragm, wherein said reference chamber comprises, a piezoelement having electrical connections and being arranged as an actor, said reference chamber containing a fluid medium.

The piezoelement functions as an electrically controllable actor. The volumetric changes of the piezoelement caused by the electric voltage applied to the piezoelement effect a modulation of the hydrostatic pressure obtained in the fluid medium. This pressure change is transmitted through the fluid medium to the flat face of the diaphragm facing the piezoelement. With a known amplitude of pressure modulation, conclusions can be drawn o directly regarding the sensitivity of the pressure transducer on the basis of the amplitude of the corresponding modulation of the output signal. It is not necessary to uncouple the diaphragm from the actual measuring process. Faulty functioning can be detected during normal operation. If, for example, in a pressure transducer linear characteristic information regarding a possible zero drift is available through measured values from system-caused measuring intervals, then with a preset pressure modulation the entire characteristic of the transducer can be determined. In this case, errors can not only be detected during operation but can also be mathematically eliminated.

In an advantageous design of the pressure transducer a measuring diaphragm of silicium is provided, which in simple manner permits conversion of the excursion of the diaphragm into electrical signals.

A ceramic piezoelement with a highblocking force is provided as the piezoelement in a preferred embodiment.

BRIEF DESCRIPTION OF THE DRAWING

For further elucidation, reference is made to the single FIGURE which shows, schematically in cross-section, a pressure transducer according to the invention.

DETAILED DESCRIPTION

According to FIG. 1, a measuring diaphragm 40 is located in a casing 42 of a pressure transducer. The measuring diaphragm 40 divides the hollow interior space 44 of the casing 42 into a pressure chamber 46 and a reference chamber 48. The o pressure chamber 46 and the reference chamber 48 are tightly sealed and each is provided with a pressure channel 47 and 49 respectively. The pressure channels are connected with a measuring medium, for example, indirectly by way of a receiving diaphragm not shown in the Figure. The pressure chamber 46 and the reference chamber 48, as well as the associated pressure channels 47 and 49 respectively are filled up to the receiving diaphragm with an at least approximately incompressible fluid medium 62, for example silicon fluid.

The measuring diaphragm 40 consists preferentially of silicon and is, for example, provided with a piezoelectric resistance bridge, which is supplied with a voltage by a current flowing through the electrical connections 52. In a preferred embodiment of a pressure transducer with digital output signal a ring oscillator of MIS-FETs is integrated into the silicium diaphragm 40 according to the European disclosure No. 0 040 795.

Opposite the diaphragm 40 in the reference chamber 48 is a piezoelement 54, which is provided with electrical connections s 56. The electrical connections 52 and 56 are gas-tight and led out of the pressure chamber 46 and the reference chamber 48 with o electrical lead-throughs 58 and 60 respectively. The piezoelement 54 consists preferentially of piezo-ceramic. Such a piezoelement 54 having an area of approximately 10 mm$^2$ and a thickness of approximately 1 mm, given an excitation voltage of, for example, approximately 100 V at hydrostatic load, supplies a blocking force of approximately 30 N. The corresponding pressure increase in the reference chamber under these conditions is then approximately $3 \times 10^6$ Pa. This hydrostatic pressure increase in the reference chamber 48 will occur if, for rapid modulation processes, the pressure compensation across the receiving diaphragm adjoining the pressure channel 49 can be neglected. The embodiment according to the FIGURE involves a differential pressure transducer. In an alternative embodiment, an absolute pressure transducer includes a pressure chamber 46, that is closed on all sides and evacuated.

What we claim is:

1. A pressure transducer comprising:
   (a) a chamber;
   (b) measuring diaphragm dividing said chamber into a pressure chamber, bordering on a first flat side of said measuring chamber, and a reference chamber, bordering on a second side flat side of said measuring chamber and containing a fluid medium;
   (c) an electrical measuring arrangement for converting an excursion of said measuring diaphragm into an electrical signal;
   (d) a piezoelement having electrical connections arranged as an actuator disposed in said reference chamber.

2. The pressure transducer of claim 1, wherein said measuring diaphragm comprises a diaphragm of silicon.

3. The pressure transducer of claim 1 wherein said piezoelement comprises a ceramic piezoelement.

* * * * *